Jan. 9, 1968 W. D. CORNELL 3,362,637
CAR HEATER SYSTEM
Filed Dec. 3, 1964
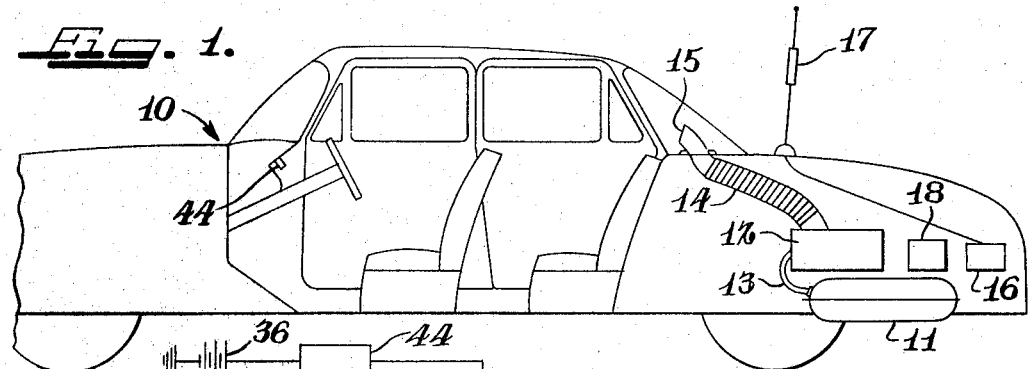
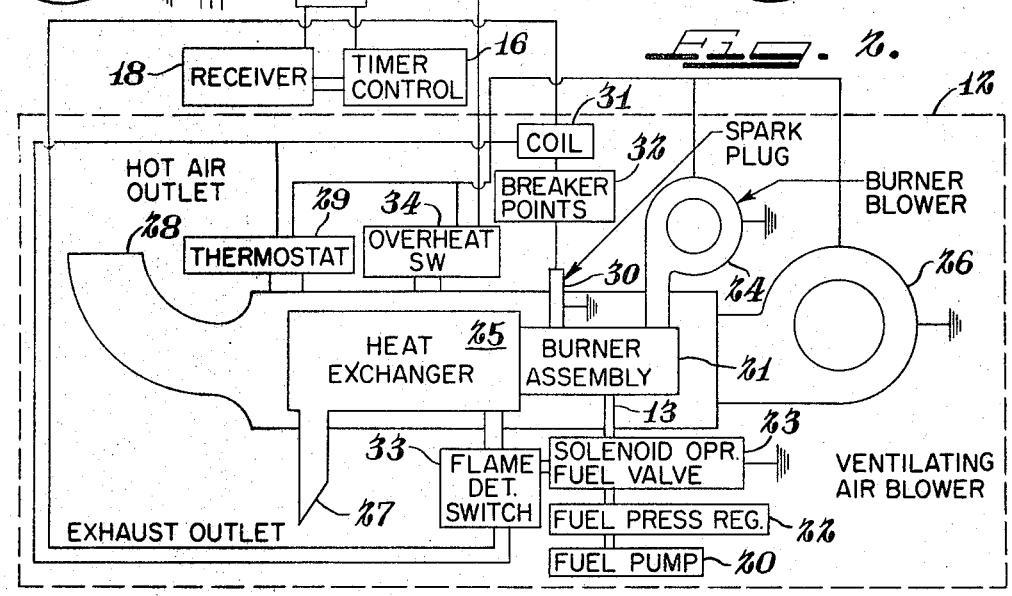
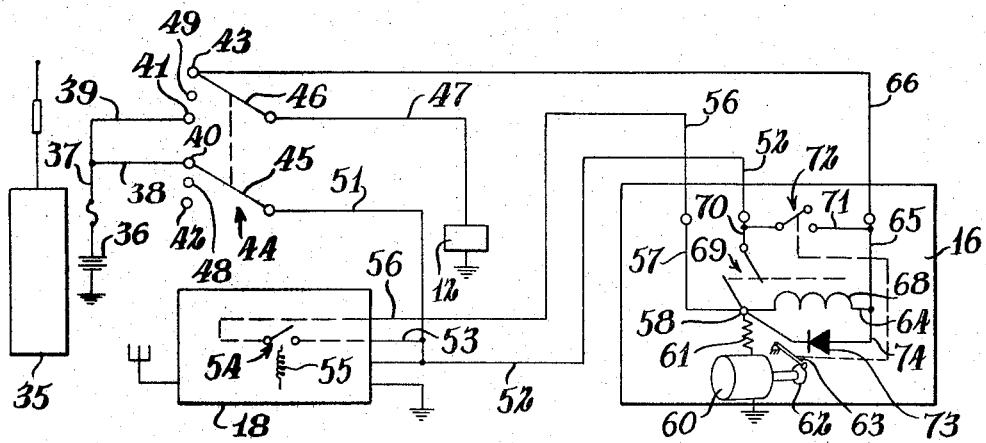
INVENTOR.
WILLIAM D. CORNELL
BY
Hofgren, Wegner,
Allen, Stellman & McCord
Attys.

United States Patent Office 3,362,637
Patented Jan. 9, 1968

3,362,637
CAR HEATER SYSTEM
William D. Cornell, Grand Haven, Mich., assignor to Brunswick Corporation, a corporation of Delaware
Filed Dec. 3, 1964, Ser. No. 415,752
4 Claims. (Cl. 237—2)

This invention relates in general to a system for heating the interior of a vehicle, such as an automobile, or the like, and more particularly to a vehicle heating system which can be controlled at a point remote from the vehicle.

During extremely cold weather, it is desirable to heat the interior of a vehicle prior to the use of the vehicle. This need has been well recognized by those skilled in the art, and various expedients have been proposed to provide vehicle preheating means. Heretofore, each of these expedients has proven undesirable in one way or another. For example, in one known system, a timer is connected to a vehicle heating means, and the timer is set to start the heating means at predetermined periods. This system is undesirable in that the vehicle can only be preheated at the time when the timer has been set. This system is obviously unsatisfactory for modern day living when vehicles, such as automobiles, are used repeatedly at different times of each day. In another known system for preheating an automobile, it has been proposed to provide suitable electrical connectors in a garage, or the like, and to connect the same to the vehicle heater when the car is parked in the garage. In this system, the other ends of the electrical connectors extend into a control panel in a home, or the like, so that the vehicle user can preheat the vehicle whenever he desires. While this system solves the problem noted above in the first mentioned system, it has the obvious drawback of requiring a physical connection between the electrical connectors and the vehicle heater every time it is desired to preheat the vehicle and is limited to use in one's own garage. In other systems, it has been proposed to provide a fixed device, such as a lamp, in the garage of the vehicle user; and to provide a light responsive device, such as a photocell, on the vehicle which is connected to the vehicle heater. In this system, the means for operating the electric lamp are in the home of the user, so that when the automobile is parked in the garage, the lamp can be lighted to energize the photocell and start the vehicle heater. This system has the inherent disadvantage of requiring the vehicle user to park his car in the same location at all times, so that the photocell will be in correct alignment with the light source. Accordingly, the general purpose of the present invention is to provide an improved means for starting the heating means of a vehicle from a remote point without starting the engine thereof, and which obviates each of the disadvantages noted above in connection with known systems.

An object of the invention is to provide a vehicle heating system which can be started from a remote point, and which requires no physical connection to the vehicle.

Another object of the invention is to provide a vehicle heating system as described in the preceding paragraph which includes a radio receiver on the vehicle, and a radio transmitter at a point remote from the vehicle for sending a signal to the receiver which in turn controls the vehicle heater.

A further object of the invention is to associate timer means with a remotely controlled vehicle heating system, as described above, which will terminate the operation of the heater after a predetermined time has elapsed.

Still another object of the invention is to provide control means for a vehicle heating system as described above, so that the heating system can be manually operated as well as remotely controlled.

These and other objects of the invention will hereinafter become more fully apparent from the following description taken in connection with the annexed drawing, wherein:

FIG. 1 is a fragmentary side elevational view of an automobile, with certain parts broken away for clarity, and illustrating a preferred embodiment of the invention;

FIG. 2 is a block diagram of a preferred embodiment of the car heating system; and FIG. 3 is an electrical schematic diagram for the illustrated embodiment of the automobile heating system.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing, wherein like reference characters designate like or corresponding parts throughout the several views, an automobile shown generally at 10 in FIG. 1 is provided with a gasoline tank 11 at the rear end thereof, as is well known in the art. The means for heating the interior of the automobile 10 includes a heater 12, which is illustrated in FIG. 1 in the trunk of the automobile 10, although, as is well known in the art, the heater 12 may be provided at other points on the automobile. As will hereinafter become more fully apparent in the discussion of FIG. 2, heater 12 in the preferred embodiment is a gasoline operated heater, and a fuel line 13 connects the gasoline tank 11 of the automobile with the heater 12. A hot air conduit 14 extends outwardly from the heater 12, and the outlet end 15 of the conduit 14 discharges hot air into the interior of the vehicle. A radio receiver 16 is carried by the vehicle 10 for starting the car heater 12, as will hereinafter appear, and an antenna 17 is provided for the radio receiver 16, and is preferably mounted on the exterior of the vehicle adjacent to the receiver. A control unit 18 for controlling the operation of the heater 12 is also carried by the vehicle, and in the illustrated embodiment the radio receiver 16 and the control unit 18 are mounted in the automobile trunk along with the heater 12.

The heater 12 is illustrated diagrammatically in FIG. 2 and may be of generally conventional design, utilizing gasoline mixed with air in a combustion chamber and ignited by a spark plug for warming a heat exchanger. The illustrated heater 12 is similar to the heater described in U.S. Patent No. 2,880,718, and reference may be made to the patent for a more detailed illustration of the heater.

The heating system includes a fuel pump 20 for pumping gasoline from the gasoline tank 11 to a suitable burner assembly 21. A fuel pressure regulating valve 22 is preferably provided in the fuel line, along with a suitable solenoid operated fuel valve 23. A blower 24 communicates with the burner 21 to provide air for combustion. A blower 26 is connected with a heat exchanger 25 to provide fresh air thereto. Heat exchanger 25 preferably includes a plurality of passages therein which allow the air introduced by blower 26 to be heated by the products of combustion from the burner assembly 21. An exhaust outlet 27 extends outwardly from the heat exchanger 25, and the products of combustion from the burner assembly 21 flow outwardly therefrom. The heated air passes outwardly from a hot air outlet 28 into the conduit 14 to the interior of the vehicle 10.

Heater 12 includes a thermostatic control 29 which is manually set to be actuated at a desired temperature. The thermostatic element preferably consists of a helical bimetallic strip which is inserted into the heated air flow adjacent the outlet 28. The rotation of the thermostatic element resulting from changes in the temperature of the heated air turns a cam, not shown, which actuates a switch. The switch cycles the fuel and ignition on and off to maintain the preselected air temperature. A spark plug 30 is used to ignite the gasoline and air mixture in the burner chamber 21, and a coil 31 and breaker points 32 are connected in circuit with the spark plug 30 to provide a source of electrical energy thereto.

As a safety measure, flame detector switch 33 is provided which is connected with the solenoid operated fuel valve 23 to prevent gasoline from entering the burner assembly 21 if the ignition system fails. Switch 33 is normally open, and when it closes, it energizes the fuel safety valve solenoid to open the valve 23. The initial gasoline for starting of the heater is stored in a built-in pressurized reservoir which is part of the fuel control valve 23. If the heater fails to start, the only fuel which enters the burner is that which is stored in the reservoir. A manual reset switch will allow fuel to enter the burner assembly if the reservoir is empty. The flame detector switch 33 consists of a spring, microswitch, and a concentric quartz rod and metallic tube. The differential expansion between the concentric quartz rod and metallic tube causes actuation of the spring loaded microswitch.

An overheat limit switch 34 is provided which consists of a bimetallic blade and a microswitch. When the temperature of the outlet air rises above a safe maximum level, the warping of the bimetallic blade will cause opening of the microswitch. This will deenergize the solenoid of the fuel safety valve 23 stopping fuel flow to the heater until cooling permits the bimetallic blade to again close the switch.

In the preferred heater embodiment, the fuel pump 20 and the cam for the breaker points 32 are driven by the motor for blowers 24 and 26.

The means for initiating the operation of the heater 12 will be best understood from a consideration of FIG. 3. This means includes a radio signal transmitter 35 which sends a high frequency radio signal that is detectable by the receiver 18, as is well known in the art.

Since several of these car heating systems may be located in the same general area, it is desirable to design the system so that a signal transmitted by one person will not turn on the car heaters in other cars located within the range of the transmitter. In order to accomplish this, the high frequency carrier is modulated by a relatively low fixed frequency tone. By way of example only, a carrier frequency of 27+ megacycles would be modulated by a 1900 c.p.s. tone signal. The receiver is responsive only to a carrier of a certain frequency modulated with a certain tone signal. Different systems would have different frequency tone signals, thereby providing a plurality of different channels for activating the car heater. In addition, different carrier frequencies are also provided, each modulated with one of the plurality of possible tone signals. The combination of different carrier frequencies each modulated with different tone signals provides the necessary different channels which could be used in the same area by different persons having the car heating system. A suitable receiver 18 may be a Model No. R-251 available from the Perma-Power Company, 3100 N. Elston Avenue, Chicago 18, Ill., and a suitable transmitter 35 may be Model No. G-340 also available from the Perma-Power Company. The present invention contemplates that the transmitter 35 will be kept in the vehicle user's home, or in his office, or on his person, so that the operation of the heater 12 can be remotely controlled. The means for providing the electrical power for operation of the heater 12 may conveniently be the storage battery 36 of the vehicle 10.

A line 37 extends from the battery 36, and lines 38 and 39 interconnect line 37 to the contacts 40 and 41 of a control device in the form of a double-pole, double-throw switch 44. Switch 44 is manually operable, and includes a pair of switch arms 45 and 46 which are movable together between a first control position, such as that shown in FIG. 3 wherein the switch arms 45 and 46 engage the contacts 40 and 43, respectively, and a second control position wherein the switch arms 45 and 46 engage the contacts 42 and 41, respectively. An intermediate center "off" position is provided by contacts 48 and 49, which are adapted to be engaged by switch arms 45 and 46, respectively. As will hereinafter become more fully apparent, when the switch arms 45 and 46 are in the position shown in FIG. 3, the heater 12 is operatively responsive to a remote signal from the transmitter 35, while when the switch arms 45 and 46 are in the second position engaging contacts 42 and 41, respectively, the heater 12 is adapted to be manually operated. The switch 44 may be conveniently located on the dashboard of the vehicle, as is shown in FIG. 1.

A line 47 connects switch arm 46 to the heater 12. Thus, when it is desired to manually control the heater 12, the switch 44 is moved from the position shown in FIG. 3 to the second position wherein the switch arm 46 engages the contact 41 so that a circuit is complete to the heater 12 through lines 37 and 39, switch arm 46, and line 47.

When the heater 12 is to be remotely controlled, the switch 44 is moved into the position shown in FIG. 3. An electrical conductor 51 connects the switch arm 45 to a lead 52 which extends from the receiver 18 to the control unit 16. A second lead 53 extends outwardly from the receiver 18 to conductor 51, and a normally open switch 54 is provided in the receiver in circuit with the line 53. A relay 55 is provided in the receiver 18 for closing switch 54 upon reception of a signal from the transmitter 35, as is well known in the art. A third lead 56 extends outwardly from the receiver 18, where it is connected in circuit with the switch 54, to the control device 16. Lead 56 is connected to a conductor 57 in the control device 16 which extends to a terminal 58.

An electric motor 60 is connected to terminal 58 by a line having a suitable resistor 61 therein. Motor 60 is part of a timing means for controlling the length of duration of heater operation, and the timer means further includes a cam 62 which is rotated by the output shaft of the motor 60. A cam follower arm 63 operates a switch to be hereafter described to initiate the operation of the heater 12, and to terminate the operation thereof after a predetermined time period has elapsed.

Thus, when switch 44 is in the position shown in FIG. 3, and the switch 54 is momentarily closed, as by the reception of a signal from the transmitter 35, a circuit is complete to the motor 60 including the battery 36, line 38, switch arm 45, line 51, lead 53, switch 54, lead 56, line 57, terminal 58 and resistor 61.

Since the signal from the transmitter 35 only momentarily closes switch 54, means are provided in the control device 16 for retaining the motor 60 energized. This means includes a relay coil 68 which is provided in a line 64, and which is energized immediately upon the closing of switch 54 via a circuit including line 57, line 64, a line 65 connected to line 64, a line 66 connected to line 65 and extending outwardly of the control device 16 to contact 43, switch arm 46, line 47, heater 12 and to ground. The resistance of relay coil 68 is sufficiently large so that the current flowing to the heater 12 is insufficient to activate the same. A normally open reed switch 69 is connected between line 52 and terminal 58 by a line 70, and reed switch 69 is closed by the relay 68 when the latter is energized. The closing of reed switch 69 completes a circuit to the motor 60 from battery 36, line 38, switch arm 45, line 51, line 52, line 70, reed switch 69, terminal 58, and resistor 61 to retain the motor energized when the signal from transmitter 35 is terminated. A normally open microswitch 72 is provided in control unit 16 and is connected between lines 52 and 66 to short out the relay coil 68. Switch 72 is closed by the cam follower arm 63 as the cam 62 begins to rotate. A blocking diode 73 is provided in a line 74 which is connected between terminal 58 and line 65 to short out the relay coil 68, and to allow current to flow from right to left, as viewed in the drawing, to deenergize by shunting the relay coil 68 after the switch 72 has closed and to maintain the motor 60 energized after reed switch 69 has opened in response to the deenergization of relay coil 68.

Thus, when switch 54 opens after the signal from the transmitter 35 has terminated, the heater 12 will be energized through a circuit consisting of the battery 36, line 37, line 38, switch arm 45, line 51, line 52, switch 72, line 66, switch arm 46, and line 47. The current flowing through line 71 will branch off and flow through lines 65 and 74, through the blocking diode 73, and through the resistance 61 to energize the motor 60. When the switch 72 is closed by the cam follower arm 63, the relay coil 68 will be shorted out, and the reed switch 69 will open, but the motor 60 will remain energized by the current flowing through diode 73, as mentioned above. When the shaft of motor 60 has completed one revolution, the cam 62 and cam follower arm 63 will open the switch 72 to deenergize the heater 12 and the motor 60. In an exemplary embodiment of the invention, the output shaft of the motor 60 makes one revolution in fifteen minutes, so that the heater 12 will be operated for a fifteen minute period when the receiver 18 receives a signal from the transmitter 35.

I claim:

1. In an automobile having an internal combustion engine, and battery operated electrical means for starting the engine, a heating system comprising: means carried by the automobile for heating the interior thereof; manually operable transmitter means remote from said automobile for sending a signal; receiver means carried by said automobile and adapted to receive a signal from the transmitter means; first switch means adapted to be momentarily actuated in response to the reception of a signal by said receiver means; a motor; circuit means connecting said first switch means and said motor to said battery for energizing said motor without starting said engine upon actuation of said first switch means; second switch means; circuit means connecting said second switch means and said motor to said battery; means for actuating said second switch means in response to the reception of a signal by said receiver means to keep said motor energized after the termination of the signal from the transmitter; third switch means; circuit means connecting said third switch, said motor, and said heating means to said battery for starting of said heating means upon actuation of said third switch means; and cam means rotated by said motor for actuating said third switch means to initiate operation of said heating means, and to terminate the operation of said heating means and deenergize said motor after a predetermined time has elapsed.

2. An automobile heating system comprising: means carried by the automobile for heating the interior thereof; manually operable transmitter means remote from said automobile for sending a signal; receiver means carried by said automobile and adapted to receive a signal from the transmitter means; first switch means adapted to be momentarily actuated in response to the reception of a signal by said receiver means; a motor; circuit means connecting said first switch means to said motor to energize the latter upon actuation of said first switch means; second switch means; circuit means connecting said second switch means and said motor; means for actuating said second switch means in response to the reception of a signal by said receiver means to keep said motor energized after the termination of the signal from the transmitter; third switch means; circuit means connecting said third switch, said motor, and said heating means for starting of said heating means upon actuation of said third switch means; and cam means rotated by said motor for actuating said third switch means to initiate operation of said heating means, and to terminate the operation of said heating means and deenergize said motor after a predetermined time has elapsed.

3. In an automobile having an internal combustion engine, and battery operated electrical means for starting the engine, a heating system comprising: means carried by the automobile for heating the interior thereof; a control device in said automobile for controlling the mode of operation of said heating means, said control device having a first remote control position, and a second manual control position; circuit means connecting said battery to said heating means for operating said heating means when said control device is in the second position; manually operable radio signal transmitting means remote from said automobile; radio signal receiving means carried by said automobile and adapted to receive a signal from the transmitting means; first switch means adapted to be momentarily actuated in response to the reception of a signal by said receiving means; a motor; circuit means connecting said first switch means and said motor to said battery when said control device is in the first position for energizing said motor without starting said engine upon actuation of said first switch means; second switch means; circuit means connecting said second switch means and said motor to said battery when said control device is in the first position; means for actuating said second switch means in response to the reception of a signal by said receiving means to keep said motor energized after the termination of the signal from the transmitting means; third switch means; circuit means connecting said third switch, said motor, and said heating means to said battery when said control device is in the first position for starting of said heating means upon actuation of said third switch means; and cam means rotated by said motor for actuating said third switch means to initiate operation of said heating means, and to terminate the operation of said heating means and deenergize said motor after a predetermined time has elapsed.

4. An automobile heating system comprising: means carried by the automobile for heating the interior thereof; manually operative transmitter means remote from said automobile for sending a signal; receiver means carried by said automobile and adapted to receive a signal from the transmitter means; starter means responsive to the reception of a signal by the receiver means for rendering said heating means operative; and timer means responsive to the reception of a signal by the receiver means for rendering said heating means inoperative after a predetermined time has elapsed; said starter means including an actuable switch connected in a circuit with the heating means, and adapted to be momentarily actuated by reception of a signal by the receiver means to render said heater means operative; said timer means including a motor connected in circuit with said switch and adapted to be energized by the actuation of the switch; a holding relay connected in circuit with said motor to keep the motor energized, said holding relay being adapted to be energized by the actuation of said switch; cam means rotated by said motor; and means responsive to a predetermined amount of rotation of the cam means for rendering the heating inoperative, and for interrupting the circuit of said motor.

References Cited

UNITED STATES PATENTS

| | | | |
|---|---|---|---|
| 1,497,194 | 6/1924 | Norden et al. | 340—224 |
| 2,212,386 | 8/1940 | Cameron | 200—38 |
| 2,475,166 | 7/1949 | Vanerka | 237—32 X |
| 3,072,176 | 1/1963 | Sunday | 237—12.31 X |
| 3,159,212 | 12/1964 | Patrick | 165—26 |
| 3,220,397 | 11/1965 | Fenner | 123—179 |
| 3,300,138 | 1/1967 | McKilligan | 237—8 |

EDWARD J. MICHAEL, *Primary Examiner.*